Patented Apr. 7, 1953

2,634,251

UNITED STATES PATENT OFFICE 2,634,251

LINEAR POLYESTER RESINS

Peter Kass, Wilmington, Del., assignor to Atlas Powder Company, Wilmington, Del., a corporation of Delaware No Drawing. Application May 11, 1949,
Serial No. 92,746

11 Claims. (Cl. 260—45.4)

This invention relates to the preparation of linear polyesters, the formation of copolymers therefrom, and more particularly to the preparation of solid, pulverulent polyester resins which are curable and which may be copolymerized with other polymerizable bodies.

Heretofore there has not been available a curable linear polyester which is sufficiently hard and friable that it can be ground to a powder for convenience in handling. In general such resins have been from soft-to-hard balsamic in character and very difficult to manipulate except in solution with polymerizable monomer or other solvent. A further disadvantage of many of the prior art curable linear polyester resins has been their limited compatibility with styrene and related polymerizable monomers. Copolymers of styrene with curable linear polyesters form a valuable group of resins and plastics, whose range of usefulness is limited if the uncured polyester and styrene can be mixed only in limited proportions to yield clear solutions for casting and the like.

An object of the present invention is to prepare new and curable linear polyester resins and copolymers therewith.

Another object is to prepare curable linear polyester resins which are sufficiently hard and friable at room temperature that they may be pulverized.

A further object is to prepare curable linear polyester resins which are highly compatible with aromatic compounds such as styrene and the like.

The above objects are accomplished according to the present invention by esterifying in approximately equimolar proportions, lower oxyalkylene ethers of selected alkylidene diphenols with unsaturated dicarboxylic acids. More specifically, the invention contemplates the esterification of a dihydric alcohol conforming to the formula

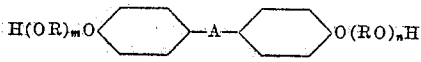

wherein A is a 2-alkylidene radical with 3 to 4 carbon atoms, R is an alkylene radical with 2 to 3 carbon atoms, $m$ and $n$ are each at least one and the average sum of $m$ and $n$ is not greater than 3; with an approximately equimolar quantity of dicarboxylic acid, at least the major proportion of which consists of fumaric acid, maleic acid or mixtures thereof. Throughout this specification the term maleic acid is to be taken as including also maleic anhydride which is a full equivalent thereof. These two acids may be generically defined as 1,2 dicarboxy ethene.

Dihydric alcohols corresponding to the above formula are disclosed in U. S. Patent 2,331,265, wherein there occur detailed instructions for preparing them by reaction between the alkali salt of an alkylidene diphenol and the appropriate olefin chlorhydrin. The linear polyesters of the present invention may be made from dihydric alcohols so prepared, or, preferably, from dihydric alcohols prepared by the direct addition of alkylene oxide to alkylidene diphenols. Methods of carrying out this addition reaction are well known in the art and are not the subject of the present invention. It may be pointed out, however, that in mixtures of alcoholic and phenolic hydroxyl compounds, the alkylene oxides react preferentially with phenolic hydroxyl. Consequently, when two or more mols of alkylene oxide are added to one mol of diphenol, both phenolic hydroxyls are substantially etherified, and the stated requirement that both $m$ and $n$ shall equal at least one is met. As a margin of safety, slightly more than the stoichiometric amount of alkylene oxide is frequently added in preparing the dihydric alcohols useful in the present invention. In such cases, random distribution of the excess oxyethylene groups between the two hydroxy ether groups is established and in the present specification dihydric alcohols made by the direct addition of alkylene oxides to diphenols will be described generically as polyoxyalkylene ethers of diphenol containing an average of $(m+n)$ oxyalkylene groups per mol where $m+n$ is the total number of oxyalkylene groups per mol.

Specific dihydric alcohols coming within the scope of the above definition are 2,2-di(4-beta hydroxy ethoxy phenyl)-propane, 2,2-di-(4-beta hydroxy ethoxy phenyl)-butane, the polyoxyethylene ether of isopropylidene diphenol wherein both phenolic hydroxyls are oxyethylated and the average number of oxyethylene groups per mol is 2.6, the polyoxypropylene ether of 2-butylidene diphenol wherein both phenolic hydroxyls are oxyalkylated and the average number of oxypropylene groups per mol is 2.5.

The linear polyester resins of the present invention comprise the esterification products of the dihydric alcohols defined and exemplified above with substantially equimolar amount of dicarboxylic acids the major proportion of which is selected from the group consisting of maleic acid, maleic anhydride, and fumaric acid. Minor proportions of the esterifying dicarboxylic acid may comprise saturated acids, aromatic acids or other unsaturated aliphatic acids, such, for example, as succinic acid, phthalic acid or itaconic acid. It is preferred, however, that at least 80 mol per cent of the dicarboxylic acid shall be selected from the first named group. In preparing linear polyesters the esterification reaction is continued until the product forms a clear pill with a melting point by the ASTM ball and ring method of at least 80° C., and preferably, at least 90° C. It has been found that with the reactants herein disclosed, linear polyesters of these high melting points are obtained easily, without carrying the degree of polymerization into the range of super polyester formation as is necessary with the linear polyesters of the prior art. The high melting resins so obtained have acid numbers ranging downward from 20, and in contrast to the prior art linear polyester resins of comparable degree of esterification are hard, pulverulent solids at ordinary temperatures. They are miscible over wide ranges of concentration with styrene and other low molecular weight aromatic solvents and may be copolymerized with styrene or other vinyl compounds to yield valuable casting and laminating resins. Moreover, the polyesters of the present invention are autopolymerizable in the presence of known curing catalysts to yield insoluble, infusible resins useful in coatings, castings and as binding agents for felted fibers.

The polyesters of the present invention may be made by esterification techniques well known in the art. In order that they shall condense to a sufficient degree to give the desired melting point the proportions of dihydric alcohol and dicarboxylic acid are so taken that at the completion of the reaction their radicals shall be present in substantially stoichiometric proportions. The reaction is carried out in an inert atmosphere, employing moderate temperatures and substantially atmospheric pressure during the early stages to minimize the loss of dibasic acids by volatilization, raising the temperature and reducing the pressure in the later stages of the reaction. Esterification catalysts may be used in certain cases although it is generally preferred to carry out the reaction in the absence of catalyst to avoid contamination of the final resinous product with catalyst residue. If desired, a small amount of a polymerization inhibitor such as hydroquinone, pyrogallol, or the like, may be added to the charge during the esterification to minimize cross linking of the polyester chains.

Details of the method of preparation of specific resins according to the invention are presented in the following examples.

*Example I*

44.4 pounds of polyoxyethylene isopropylidene diphenol, having an average of 2 oxyethylene groups per mol of the diphenol, and 16 pounds of fumaric acid were heated together with 27.4 grams of hydroquinone in an agitated kettle under an atmosphere of carbon dioxide at a temperature of 185°–190° C. for one hour. The temperature was then raised to 200°–205° C. and heating continued for an additional three hours. At this point a sample withdrawn from the charge had an acid number of 28. Vacuum was then applied and heating of the charge continued at 200°–205° C. under a pressure of 10 mm. for another two hours after which the contents of the kettle were discharged. The resulting product was a light tan resin, hard at room temperature, melting, by the ball and ring method, at 107° C., with an acid number of 13. It was quite tough although amenable to grinding in a hammer mill to a fine powder which did not block on storage at room temperature.

*Example II*

100 grams of the polyoxyethylene ether used in Example I and 34.17 grams of maleic anhydride were heated together under an atmosphere of carbon dioxide in a stirred reaction flask at a temperature of 180°–185° C. for one hour. 0.14 grams of hydroquinone were then introduced, the temperature was raised to 200°–205° C. and the reaction continued for 1.3 hours at that temperature. The acid number of a sample withdrawn at this point was 28. Pressure in the flask was reduced to 10 mm. and heating continued at the same temperature for 3.5 hours. The product so formed was a clear yellow resin, hard and tough at room temperature, melting at 99° C. by the ball and ring method, and having an acid number of 3.

A 10% excess of maleic anhydride over the stoichiometric amount was used in charging the above described run to compensate for its loss by volatilization during the early part of the reaction.

*Example III*

284.65 grams of polyoxypropylene isopropylidene diphenol having an average of 2 oxypropylene groups per mol, 97.5 grams of fumaric acid and 0.38 grams of hydroquinone were heated together in a stirred reaction flask at a temperature of 185°–190° C., and under an atmosphere of carbon dioxide for 2.25 hours. The temperature was then raised to 215°–220° C., and the reaction continued for 2.75 hours. The acid number of a sample withdrawn at this point was 30. The pressure was reduced to 17 mm. and heating continued at 215°–220° C. for one hour. A portion of the resin withdrawn at this point was hard and brittle at room temperature, melted at 100° C., and had an acid number of 20. The remainder of the charge was heated an hour longer at the same temperature and pressure before being poured. The final product so obtained was hard and brittle at room temperature, melting at 110° C., and having an acid number of 17.

*Example IV*

316.3 grams of the polyoxyethylene ether of 2-butylidene diphenol containing an average of 2.7 oxyethylene groups per mol, 102.2 grams of fumaric acid and 0.42 gram of hydroquinone were charged into a stirred reaction flask and heated under an atmosphere of carbon dioxide for one hour at 185°–190° C. The temperature was raised to 200°–205° C. and heating continued for an additional 2-hour period at which point the acid number of a withdrawn sample was found to be 30. The pressure in the reaction flask was reduced to 3 mm. and heating continued at the same temperature for 2.5 hours longer. The product was a hard, brittle, light tan resin, of melting point 103° C. and acid number 10.

Curing of the resins of the present invention by autopolymerization is exemplified in the two following examples.

*Example V*

2% (based on the resin) of benzoyl peroxide was dissolved in a 50% solution of the product of Example I in benzene. A 3 mil film of the resulting solution was applied to tin plate and placed in an oven at 125° C. for 1 hour. The resin was thereby cured to a hard, brittle film, insoluble in the common solvents.

Example VI 4 parts of powdered stannic chloride pentahydrate were intimately mixed with 100 parts of the resin of Example I. This mixture was placed on a metal cure plate which was maintained at 200° C. Within 2 minutes the fused resin was cured to the insoluble infusible state.

If, instead of stannic chloride, half as much cobaltous nitrate hexahydrate is employed as the catalyst, the curing time of this same resin is less than one minute at 200° C.

The polyester resins of the present invention are copolymerizable with vinyl compounds to yield resins useful in the coating, casting and laminating arts. Of particular interest are copolymerization products with styrene where the high degree of compatibility between said polyester resins and aromatic compounds permits compounding over a very wide range of concentration. In fact, copolymers may be formed from styrene and linear polyesters made in accordance with the present invention with proportions of ingredients ranging all the way from 5% styrene–95% polyester to 5% polyester–95% styrene. More generally useful, and therefore preferred, are copolymers wherein the proportion of styrene to linear polyester ranges between the limits of 70 to 30 and 30 to 70.

Copolymerization of resins of the present invention with vinyl compounds is exemplified in the following.

Example VII

A solution consisting of 1 part by weight of the resin of Example I, in 4 parts of styrene and containing 1% of benzoyl peroxide was poured into a 16 by 150 mm. test tube to a depth of 7 cm. The mixture was cured by holding in an oven at 45° C. for 24 hours. The casting obtained was a clear, light yellow, hard, and infusible resin.

Example VIII

A 10-ply glass cloth laminant of excellent tensile and flexural strength was prepared by impregnating woven glass cloth with a solution of 60% of the resin of Example I in 40% styrene catalyzed with 0.1% benzoyl peroxide and curing at 30 lbs. per square inch pressure for 20 minutes at 180° F., and 30 minutes at 250° F.

Because of their high melting point and pulverulent nature the resins of this invention are especially useful in many ways. They are relatively stable in the solid condition against autopolymerization and can be stored without refrigeration. They can be weighed out in small portions and dissolved in styrene monomer to form casting and laminating resins at the point of use and in the amount immediately required. The balsamic nature of the prior art linear polyesters has made on-the-job mixing with styrene infeasible, with the consequence that such solutions must be prepared in bulk. The convenience and economy of being able to make casting and laminating solutions as required is obvious. A second advantageous method by which a powdered polyester resin may be used, a method denied to users of the prior art balsamic polyesters, is to incorporate the powdered resin and a polymerizing catalyst directly in felted mats of fibrous materials such as glass wool or the like, and subject the treated mats to curing conditions. There are obtained in this way structures of great strength and utility.

Many other uses for the polyester resins here disclosed will suggest themselves to those in the arts. They may be mixed with pigments and fillers to make molding powders in the presence or absence of other copolymerizable compounds. They are valuable ingredients of lacquers, enamels and other coatings where they may be combined with other known coating resins and film formers if desired and may be pigmented or not according to the type of finish required.

The examples shown above and the suggested uses for the polyester resins of this invention mentioned herein are illustrative only and are not to be construed as limitations on the scope thereof.

What is claimed is:

1. A curable polyester resin as in claim 11 wherein the 1,2 dicarboxy ethene is fumaric acid.

2. A curable polyester resin having a melting point of at least 90° C., comprising the esterification product of 2.2-di(4-beta hydroxy ethoxy phenyl) propane and fumaric acid.

3. A curable polyester resin having a melting point of at least 90° C., comprising the esterification product of a polyoxyethylene ether of isobutylidene diphenol having an average of from 2 to 3 oxyethylene groups per mol and fumaric acid.

4. The copolymerization product of a curable, polyester resin, having a melting point of at least 80° C., comprising the esterification product of a dihydric alcohol conforming to the formula

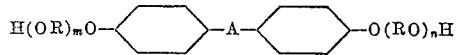

wherein R is an alkylene radical having from 2 to 3 carbon atoms, A is a 2-alkylidene radical having from 3 to 4 carbon atoms, $m$ and $n$ are each at least one and the average sum of $m+n$ is not over 3, with a substantially equimolar quantity of a dicarboxylic acid, at least 80 mol percent of which consists of 1,2 dicarboxy ethene, with a polymerizable vinyl compound.

5. The copolymerization product of a curable, polyester resin, having a melting point of at least 80° C., comprising the esterification product of a dihydric alcohol conforming to the formula

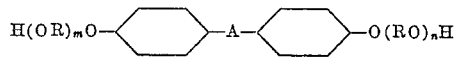

wherein R is an alkylene radical having from 2 to 3 carbon atoms, A is a 2-alkylidene radical having from 3 to 4 carbon atoms, $m$ and $n$ are each at least one and the average sum of $m+n$ is not over 3, with a substantially equimolar quantity of a dicarboxylic acid, at least 80 mol percent of which consists of 1,2 dicarboxy ethene, with styrene, wherein the weight proportion of said resin to styrene lies between the limits of 95 to 5 and 5 to 95.

6. The copolymerization product of a polyester resin comprising the esterification product of substantially equimolar quantities of 2.2-di(4-beta hydroxy ethoxy phenyl) propane and fumaric acid reacted to a melting point of at least 90° C., and styrene, wherein the weight proportions of said resin to styrene lie between the inclusive limits of 70 to 30 and 30 to 70.

7. A curable polyester resin having a melting point of at least 80° C., comprising the esterification product of a dihydric alcohol conforming to the formula

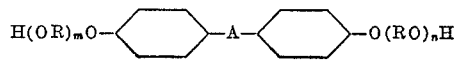

wherein R is an alkylene radical having from 2 to 3 carbon atoms, A is a 2-alkylidene radical having from 3 to 4 carbon atoms, $m$ and $n$ are each at least one, and the average sum of $m$ and $n$ is not over 3; with a substantially equimolar quantity of 1,2 dicarboxy ethene.

8. A curable polyester resin having a melting point of at least 90° C., comprising the esterification product of substantially equimolar quantities of fumaric acid with the polyoxypropylene ether of isopropylidene diphenol having an average of 2 oxypropylene groups per mol.

9. A curable polyester resin having a melting point of at least 90° C., comprising the esterification product of substantially equimolar quantities of fumaric acid with the polyoxypropylene ether of 2-butylidene diphenol having an average of 2 oxypropylene groups per mol.

10. The copolymerization product of a polyester resin as defined in claim 7 and styrene, wherein the weight proportions of said resin to styrene lie between the limits of 95 to 5 and 5 to 95.

11. A curable polyester resin having a melting point of at least 90° C., comprising the esterification product of a dihydric alcohol conforming to the formula

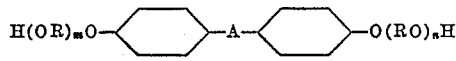

wherein R is an alkylene radical having from 2 to 3 carbon atoms, A is a 2-alkylidene radical having from 3 to 4 carbon atoms, $m$ and $n$ are each at least one and the average sum of $m+n$ is not over 3, with a substantially equimolar quantity of a dicarboxylic acid, at least 80 mol percent of which consists of 1,2 dicarboxy ethene and up to 20 mol percent of which is selected from the group consisting of succinic acid, phthalic acid and itaconic acid.

PETER KASS.

REFERENCES CITED

The following references are of record in the file of this patent:

UNITED STATES PATENTS

| Number | Name | Date |
|---|---|---|
| 2,106,452 | Bruson et al. | Jan. 25, 1938 |
| 2,331,265 | Coleman et al. | Oct. 5, 1943 |
| 2,437,046 | Rothrock et al. | Mar. 2, 1948 |

OTHER REFERENCES

Kropa, p. 351, 356–361 Electrochemical Society Preprint 90–29 received December 3, 1946.